Jan. 18, 1938.  F. G. SILVA  2,105,618

METHOD OF MAKING COLLETS

Filed Sept. 18, 1934

INVENTOR
FREDERICK G. SILVA
BY D. Clyde Jones
ATTORNEY

Patented Jan. 18, 1938

2,105,618

UNITED STATES PATENT OFFICE 2,105,618

METHOD OF MAKING COLLETS

Frederick G. Silva, Rochester, N. Y., assignor to Davenport Machine Tool Co., Incorporated, Rochester, N. Y., a corporation of New York Application September 18, 1934, Serial No. 744,530

3 Claims. (Cl. 29—156)

The present invention relates to collets and to their manufacture.

Collet-chucks are of two types, expanding and contracting. In the first type, the collet grips when expanded and in the second type, the collet grips when contracted. In the first type, the collet is expanded in the bore of the article to be chucked and the external faces of the jaws of the collet engage the bore of the article. In the second type, the article to be chucked is held within the bore of the collet and the internal faces of the jaws grip the external surface of the article being chucked. In the case of the expanding type collets, it is usual to make the internal surfaces of the jaws tapered and operate the collet by a member having an external tapered surface which is mounted to reciprocate in the bore of the collet. In the case of the contracting type collets, the actuating member is tubular and has an internal tapered surface which coacts with external tapered surfaces on the collet jaws.

The present invention has particular reference to collets of the contracting type although the features of the invention may also be applied to the expanding type of collet.

The primary object of this invention is to provide a collet whose jaws will have a minimum of frictional contact with the surfaces of the actuating member so that they will have no tendency to stick in chucked position but may be closed and released with ease and may be operated readily to or from chucking position.

A further object of the invention is to provide a simple, inexpensive method of manufacturing such a collet.

To these ends, collets are made according to the present invention by grinding their jaws after hardening so that their tapered surfaces will have line contact only with the coacting tapered surfaces of the actuating member employed to operate the collet. In the case of a contracting type collet, the desired result is attained by compressing the jaws after the hardening operation and conically grinding the tapered surfaces of the jaws while compressed. In the case of an expanding type collet, the jaws are expanded after hardening and then conically ground.

In the accompanying drawing, there is illustrated a preferred method of manufacturing a contracting type of collet according to the present invention and the resulting collet.

Figure 1:
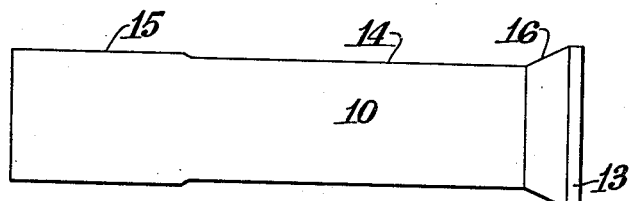
Figs. 1 to 6 illustrate successive intermediate stages in the manufacture of a contracting type collet, Figs. 1, 3, and 5 being side elevations and Figs. 2, 4, and 6 end views.
Figure 2:
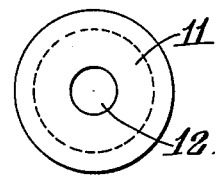
Figure 3:
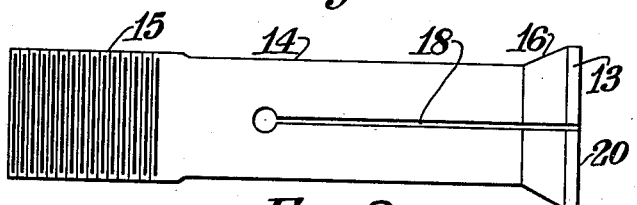
Figure 4:
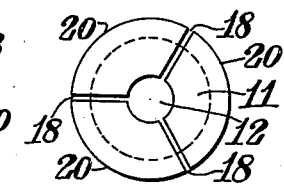

In Figs. 1 and 2, I have shown a typical collet at the end of its first stage of manufacture. A bar of stock 10 having a plane end face 11 has been drilled to provide a central lengthwise bore 12 and has been turned externally to provide cylindrical portions 13, 14 and 15 and a conically tapered portion 16. The cylindrical portion 13 is a narrow land which is provided principally to facilitate chucking of the collet in its final stage of manufacture as will hereinafter appear. The cylindrical portion 14 is elongated and of reduced diameter. It lies between the cylindrical portion 15 and the tapered portion 16.

In the second stage of manufacture, the land 13, tapered portion 16 and cylindrical portion 14 are slotted longitudinally and the cylindrical portion 15 is threaded. The elongated slots 18 extend through the bar from outside to the central bore 12 and divide the bar into three gripping jaws 20.

Figure 5:
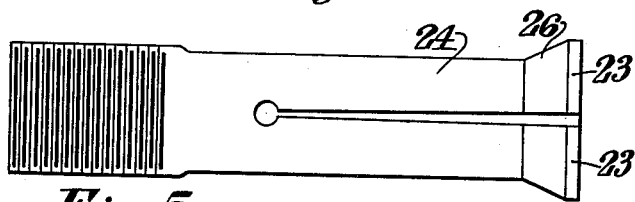
Figure 6:
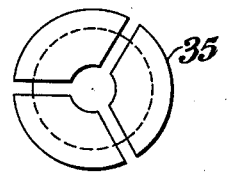

The next step is to spread the jaws and heat treat them so that they will have a normally expanded position as shown in Figs. 5 and 6 and will be both resilient and hardened against wear. Each jaw 20 now has an arcuate land 23 forming part of the original cylindrical surface 13, a conical surface 26 forming part of the original conical surface 16, and a cylindrical portion 24 forming part of the original cylindrical surface 14.

Figure 7:
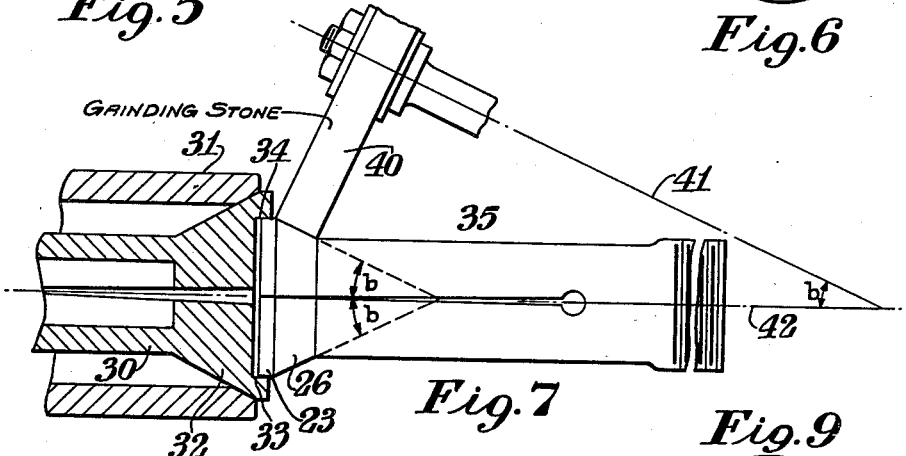
Fig. 7 is a side elevation illustrating the final step in the manufacture of the collet, viz., the grinding operation.

The final step in manufacture is shown in Fig. 7. In this operation, the jaws of the collet are compressed and the tapered portions of the jaws are conically ground.

For compressing the jaws and holding the collet during the grinding operation, it is most convenient to use a chuck of the type shown in Fig. 7. It comprises a collet 30 and a tubular actuating member 31. The collet has gripping jaws 32 which are recessed as indicated at 33 and have arcuate gripping surfaces 34 that are adapted to grip the arcuate lands 23 of the jaws of the collet being ground. The collet to be ground, which has been designated 35, is inserted in the jaws of the collet 30 and the collet 30 is actuated to grip the collet 35 and compress its jaws by relative movement of the collet 30 in the tubular member 31.

The chuck and the collet 35 mounted in it are then adjusted so that the tapered surfaces 26 of the jaws of the collet are in operative relation with the cylindrical grinding wheel 40 which is so mounted that its axis 41 is inclined to the rotary axis 42 of the chuck at an angle $b$ corresponding to the angle $b$ of the cone surfaces which it is desired to grind on the collet-jaws. For the type of collet shown, this angle will be less than the cone angle of the conical surface of the actuating member with which the collet is to coact.

The final tapered surfaces are ground on the jaws of the collet by rotating the chuck and grinding wheel on their respective axes 42 and 41, or by rotating the wheel on its axis 41 and simultaneously revolving the wheel about the axis 42 of the collet while holding the collet stationary.

Figure 8:
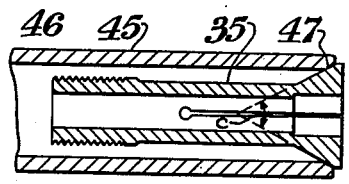
Fig. 8 is a longitudinal sectional view through a collet-type chuck constructed according to the present invention.
Figure 9:
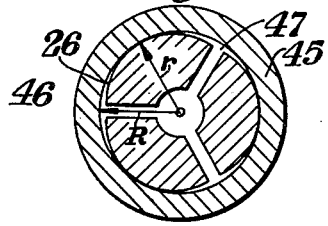
Fig. 9 is a transverse sectional view through this chuck.

The completed collet is shown in use in Figs. 8 and 9, where it coacts with a tubular member 45 to form a chuck, designated as a whole, 46. The tubular member has a conical internal surface 47 which must be of large enough cone angle to receive the expanded jaws of the collet and which will, therefore, have a cone angle $c$ greater than the cone angle $b$ of the tapered surfaces 26 of the collet jaws when contracted as shown in Fig. 7. The tapered portions of the collet jaws do not have, therefore, full surface contact with the tapered internal surface 47 of the tubular member, but have only line contact therewith. The radius of curvature $r$ of the tapered portions 26 of the collet jaws is by reason of their method of manufacture less than the radius of curvature $R$ of the tapered surface 47 of the tubular member 45 in any transverse section through the chuck, as, for instance, that of Fig. 9. This construction makes the chuck very easy to operate due to less friction in the closing movement while it still has more gripping effect than any of the old styles of collet chucks.

Now while the invention has been illustrated in connection with a particular embodiment thereof, it will be understood that it is capable of various modifications and this application is intended to cover any variations, uses or adaptations of the invention coming within the scope or the limits of the appended claims.

Having thus described my invention, what I claim is:

1. The method of producing a collet which comprises shaping a piece of stock to provide an elongated cylindrical portion having a conical portion adjacent one end, providing a central bore in the stock extending along its major axis, slitting the stock longitudinally through said conical portion and through a part of the adjacent cylindrical portion to provide gripping jaws, heat treating the collet to harden the same, compressing the jaws to temporarily reduce the cone angle thereof and bring the outer end portions of the edges of the jaws substantially in contact by gripping the free ends of said jaws beyond the conical portion, uniformly grinding the conical surface of the jaws while thus compressed and releasing the compression on the jaws to permit them to regain their normal cone angle whereby the conical surfaces of the jaws will have line contacts with the coacting tapered surface of the actuating member with which the collect is to cooperate while in use.

2. The method of producing a collet which comprises shaping a piece of stock to provide an elongated cylindrical portion having an outwardly flaring conical portion adjacent one end, providing a central bore in the stock extending along its major axis, slitting the stock longitudinally through said conical portion and through a part of the adjacent cylindrical portion to provide gripping jaws, heat treating the collet to harden the same, compressing the jaws to temporarily reduce the cone angle thereof and bring the outer end portions of the edges of the jaws substantially in contact by gripping the free ends of said jaws beyond the conical portion, uniformly grinding the conical surface of the jaws while thus compressed and releasing the compression on the jaws to permit them to regain their normal cone angle whereby the conical surfaces of the jaws will have line contacts with the coacting tapered surface of the actuating member with which the collet is to cooperate while in use.

3. A stage in the method of producing a collet having a conical portion adjacent one end which comprises supporting the conical end of the collet for grinding solely by gripping the free ends of the jaws externally and beyond the conical portion thereof to bring the outer end portions of adjacent jaws substantially into contact, and uniformly grinding the conical surface of the jaws while so supported.

FREDERICK G. SILVA.